United States Patent [19]

Hackl

[11] Patent Number: 5,480,463
[45] Date of Patent: Jan. 2, 1996

[54] APPARATUS FOR FLUE GAS CLEANING

[76] Inventor: Harald Hackl, Hof 1, D-82392 Habach, Germany

[21] Appl. No.: 170,300

[22] PCT Filed: Jun. 25, 1992

[86] PCT No.: PCT/DE92/00520

§ 371 Date: Jun. 9, 1994

§ 102(e) Date: Jun. 9, 1994

[87] PCT Pub. No.: WO93/00150

PCT Pub. Date: Jan. 7, 1993

[30] Foreign Application Priority Data

Jun. 28, 1991 [DE] Germany .............................. 9107979 U

[51] Int. Cl.⁶ ........................... B01D 47/06; B01D 47/18
[52] U.S. Cl. ................. 55/222; 55/223; 55/228; 55/257.7
[58] Field of Search .................... 55/222, 223, 227–230, 55/237, 238, 257.1, 257.7

[56] References Cited

U.S. PATENT DOCUMENTS

| | | | |
|---|---|---|---|
| 1,100,144 | 6/1914 | Noble | 55/230 |
| 1,117,309 | 11/1914 | Bentz | 55/228 X |
| 1,641,995 | 9/1927 | Schobrone | 55/229 X |
| 2,057,579 | 10/1936 | Kurth | 55/228 X |
| 2,252,982 | 8/1941 | Roberts | 55/230 X |
| 3,005,515 | 10/1961 | Caddell | 55/222 |
| 3,282,032 | 11/1966 | King, Jr. et al. | 55/228 X |
| 3,304,695 | 2/1967 | Krochta | 55/238 |
| 3,348,363 | 10/1967 | King, Jr. et al. | 55/227 |
| 3,712,031 | 1/1973 | Santa Cruz | 55/223 |
| 3,797,204 | 3/1974 | Cavatassi | 55/228 X |
| 3,824,768 | 7/1974 | Van Diepenbroek | 55/223 |
| 3,861,891 | 1/1975 | Noguchi et al. | 55/227 X |
| 3,880,623 | 4/1975 | Aoyama | 55/230 |
| 3,960,992 | 6/1976 | Cyrenne | 55/222 X |
| 4,121,541 | 10/1978 | Kneissl et al. | 55/257.7 X |
| 4,171,961 | 10/1979 | Winters | 55/237 X |
| 4,543,111 | 9/1985 | Müller et al. | 55/230 |
| 5,217,508 | 6/1993 | Jonsson | 55/222 X |
| 5,261,936 | 11/1993 | Someus | 55/222 |

FOREIGN PATENT DOCUMENTS

| | | |
|---|---|---|
| 0096149 | 12/1983 | European Pat. Off. . |
| 0528483 | 2/1993 | European Pat. Off. ................ 55/230 |
| 328798 | 1/1903 | France . |
| 1055181 | 2/1954 | France . |
| 2162144 | 7/1973 | France . |
| 2935296 | 3/1921 | Germany . |
| 0336828 | 5/1921 | Germany .............................. 55/222 |
| 2236389 | 2/1974 | Germany . |
| 2362635 | 6/1975 | Germany . |
| 2416958B2 | 10/1975 | Germany . |
| 2437743 | 2/1976 | Germany . |
| 2641204A1 | 3/1977 | Germany . |
| 2802018 | 7/1979 | Germany . |
| 2946256A1 | 5/1981 | Germany . |
| 3227187C1 | 10/1983 | Germany . |
| 3426015 | 2/1985 | Germany . |
| 3333898A1 | 4/1985 | Germany . |
| 3603117C2 | 8/1987 | Germany . |
| 3618511A1 | 12/1987 | Germany . |
| 3737500A1 | 5/1988 | Germany . |
| 8816486U1 | 10/1989 | Germany . |
| 4039554A1 | 8/1991 | Germany . |
| 2104470 | 8/1979 | United Kingdom . |
| 2169816 | 7/1986 | United Kingdom . |

*Primary Examiner*—Robert Spitzer
*Attorney, Agent, or Firm*—Sessions & Fishman

[57] ABSTRACT

Apparatus for flue gas cleaning comprising a scrubbing chamber, a flue gas feeder, a flue gas discharger, a drain for used scrubbing water and a device for feeding and atomizing the scrubbing water. The scrubbing chamber can be divided into a scrubbing zone, a centrifuging zone and a fan zone, and arranged in the scrubbing chamber is a device which is rotatable about a horizontal axis and which conveys the flue gas and the atomized scrubbing water in helical movements in a horizontal direction through the scrubbing chamber. Preferably, the scrubbing water is circulated, wherein there may be provided a settlement tank for settlement of solid contaminating materials from the used scrubbing water, for energy recovery.

21 Claims, 8 Drawing Sheets

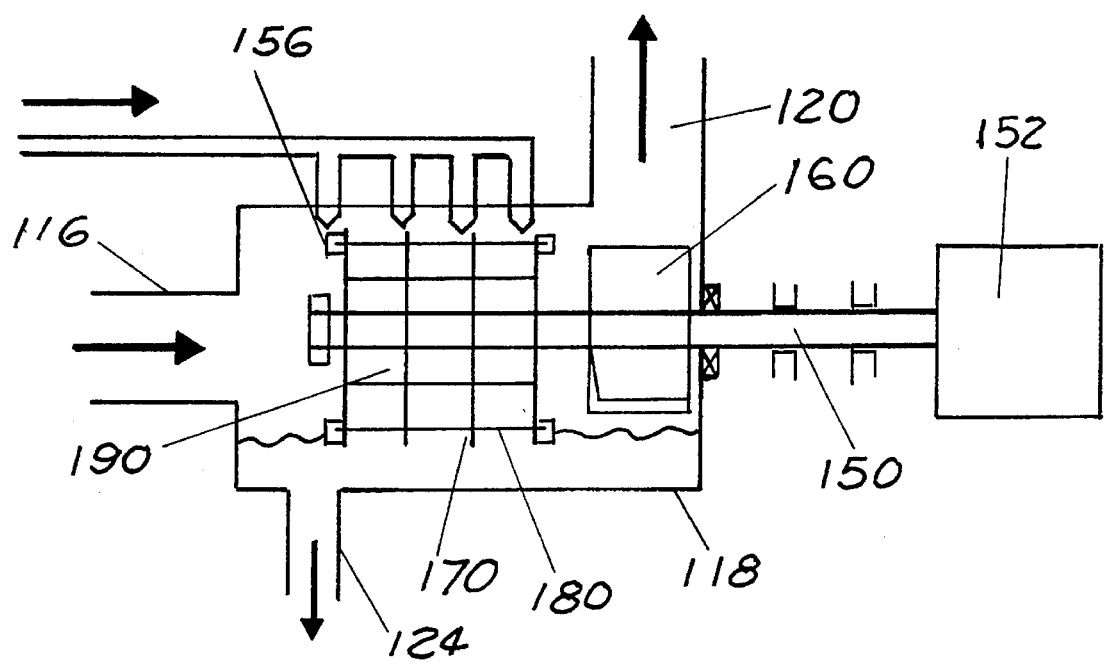
FIG. 4
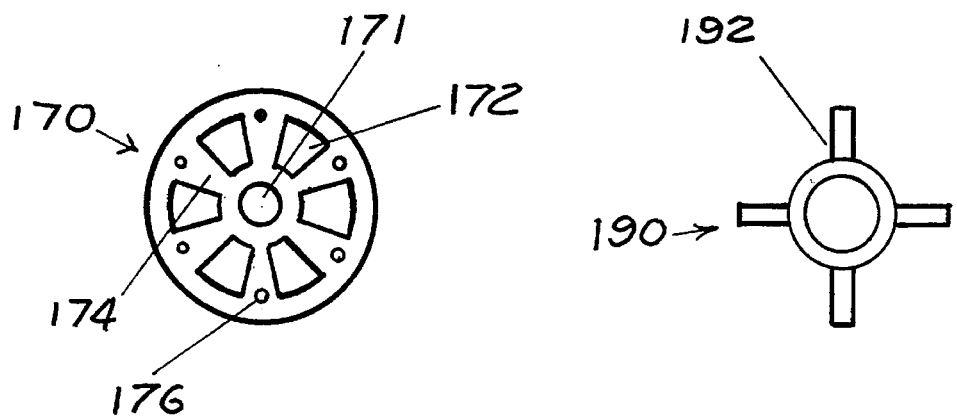
FIG. 5
FIG. 6

5,480,463

APPARATUS FOR FLUE GAS CLEANING

The present invention concerns an apparatus for flue gas cleaning.

The firing installations which are conventional at the present time require a given waste gas temperature so that no condensate is formed in the chimney. Depending on the building material involved the chimneys even have to be insulated so that the required waste gas temperature (about 180° C.) can be maintained. As a result a relatively large proportion of the energy produced is not used and is pointlessly discharged to the environment.

In the case of firing installations which are operated with oil and gas, there are already heating systems which, by way of further heat exchangers, cool the flue gas down to about 45°. In such an arrangement the second heat exchanger is of high-grade steel and delivers the thermal energy to the boiler. The third heat exchanger is of plastic material and warms the intake air for the burner. The condensate which is produced in that operation is removed by way of a catalyst.

However this method cannot be used in relation to solid fuels. More specifically, excessive amounts of dusts and ashes are produced in the combustion of solid fuels. As a result the condensate is not produced in the form of a fluid. On the contrary what is produced is a tarry-resinous residue which would clog the corresponding further heat exchangers within a short period.

In addition for example pure wood-burning heating installations can scarcely still comply with the omission values which are required nowadays. The combustion of partially chemically charged wood products such as for example chipboards (formaldehyde) and chips is no longer possible in consideration of the omission requirements.

In regard to such flue gas cleaning apparatuses the closest state of the art is to be found in FR-A-1 055 181. That publication already discloses an apparatus for flue gas cleaning comprising a scrubbing chamber, a flue gas feed, a flue gas discharge and a drain for used scrubbing water and a device for the feed and atomisation of the scrubbing water, wherein arranged in the scrubbing chamber is a device which is rotatable about a horizontal axis by means of a drive motor and which carries devices for atomisation of the scrubbing water. That publication represents the closest state of the art in terms of the general kind of apparatus in relation to the present invention.

FR-A-328 798 discloses an apparatus which is extremely similar to the above-indicated flue gas cleaning apparatus.

DE-A-24 37 743 discloses a flue gas cleaning apparatus in which the flue gas is passed through a scrubbing chamber in which there is arranged a hollow rotary body whose front portion contains a nozzle system and on the surface of which are disposed guide vanes. In that arrangement however the vanes serve to drive the hollow rotary body insofar as they take the kinetic energy required for that purpose from the movement of the flow of flue gas through the scrubbing chamber.

FR-A-2 162 144 discloses a flue gas cleaning apparatus having a scrubbing chamber in which the flue gas is also acted upon by droplets of water sprayed by a rotating device.

EP-A-0 096 149 discloses a flue gas cleaning method using a chamber having a coaxial rotary atomiser device, by means of which scrubbing fluid is introduced in drop form into the flow of gas and brought into contact with the suspended substances.

GB-A-2 014 470 discloses apparatus for removing dust from gas, in which cleaning water which is sprayed in is also atomised and brought into contact with a flow of gas to be cleaned.

DE-A-23 62 635 discloses a flue gas cleaning apparatus in which the flue gas is passed through a scrubbing chamber in which a hollow rotary body is rotatably and drivably arranged, the front portion thereof containing a nozzle system and guide vanes being disposed on the surface thereof. The vanes serve for a helical movement of the flow of flue gas past the hollow rotary body which is in spindle form and which fills a large part of the scrubbing chamber and which is not permeable to gas.

Starting from those known apparatuses, the object of the present invention is further to improve the cleaning effect and at the same time substantially reduce the amount of space required by the cleaning apparatus and in so doing additionally provide a possible way of recovering energy.

In accordance with the invention that object is attained by the features of claim 1.

In that arrangement the scrubbing water can preferably be used a number of times by circulation thereof. That reduces the consumption of water and the amount of contaminated waste water produced. At the same time the scrubbing water temperature is increased.

It is then possible on the one hand to allow the contaminating solid materials to settle in a tank and then to remove only the sediment as waste water. The contaminating solid materials can naturally also be removed by means of a filter. At the same time the waste water can be used in clarifying installations for the neutralisation operation. At the same time the repeatedly circulated scrubbing water attains such a high temperature that thermal energy can be taken therefrom by means of a heat exchanger. That thermal energy is therefore practically recovered from the flue gas.

The invention thus additionally permits better use to be made of the energy of the fuel. In addition the procedure involves partial neutralisation of the gaseous pollutants ($SO_2$, $NO_X$) by the alkaline salts (for example potassium carbonate) which are contained in the fly ash, by virtue of the respective solution of such substances in the water. In that way the problem of 'acid rain' can also be shifted from the air into the water where it can be easily resolved by buffering or neutralisation.

Advantageous developments of the invention are set forth in the appendant claims.

The invention is to be described in greater detail hereinafter with reference to the accompanying drawings.

In the drawings:

FIG. 1 is a block circuit diagram of a heating installation provided with a flue gas cleaning apparatus according to the invention, FIG. 2 is a view in longitudinal section through a scrubbing chamber of a flue gas cleaning apparatus according to the invention, FIG. 3 is a view in section through the scrubbing chamber of the flue gas cleaning apparatus according to the invention as shown in FIG. 2, taken along section line 3—3;

FIG. 4 is a view in cross-section through a scrubbing chamber of another flue gas cleaning apparatus according to the invention;

FIG. 5 shows one of the disks which are used in the flue gas cleaning apparatus shown in FIG. 4;

FIG. 6 shows a spacer ring with vanes welded thereon, as is used in the flue gas cleaning apparatus shown in FIG. 4;

Figure 1:
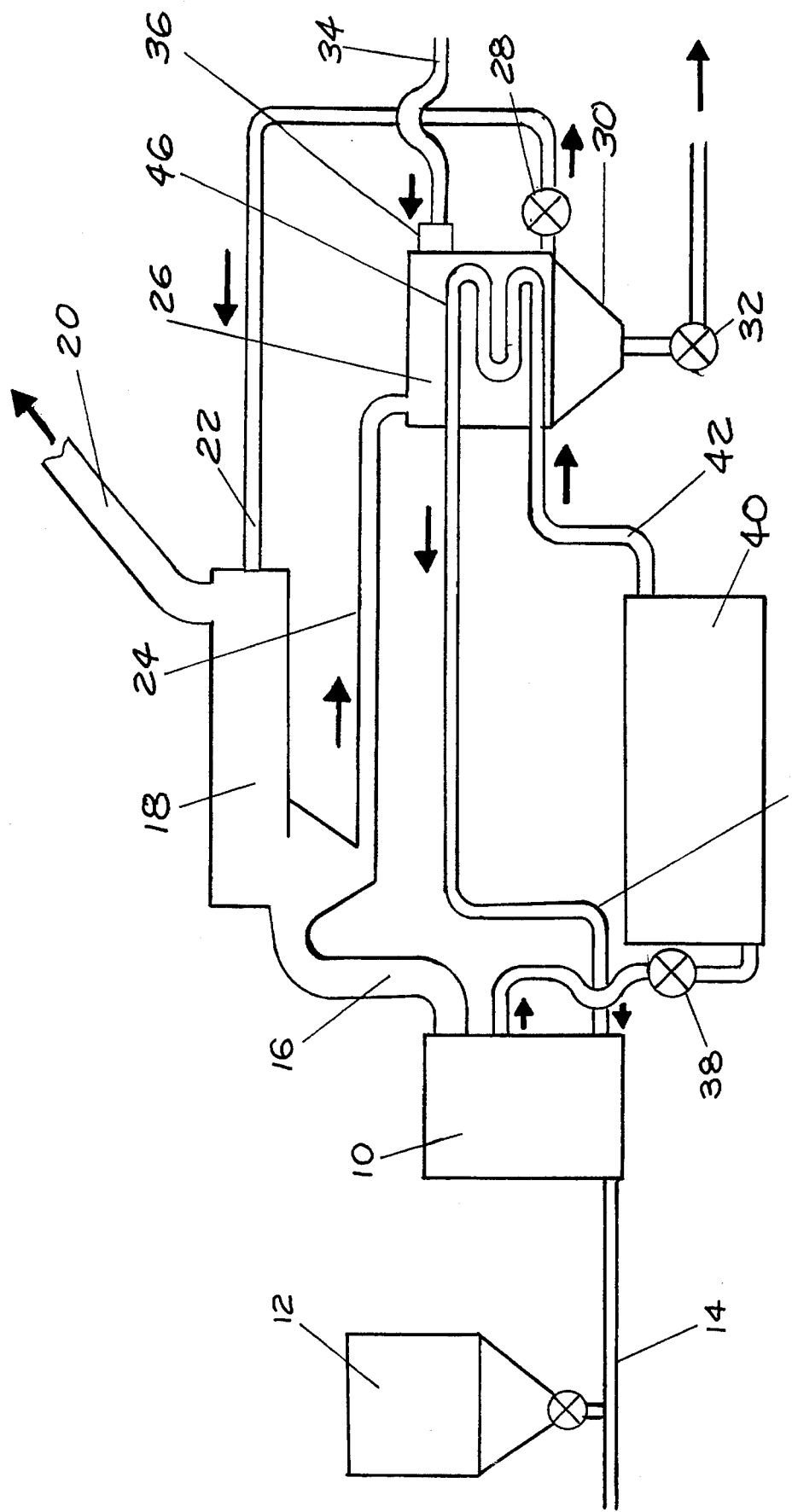

As shown in FIG. 1 a heating installation with an apparatus for flue gas cleaning in accordance with the invention includes a conventional heating boiler 10 in which solid fuels are burnt and with the waste heat of which a medium is heated. It will be appreciated that the apparatus according to the invention can also be used with other fuels.

In that arrangement the solid fuels can be automatically supplied from a supply container 12 by way of a feed means 14.

The waste gases which are produced in that operation are fed by way of a flue gas discharge 16 to the scrubbing chamber 18. The scrubbing chamber 18 is described in greater detail hereinafter with reference to FIGS. 2 and 3. At any event it has a connection for the flue gas conduit 20 to the chimney. The cleaned waste gases are fed to a normal chimney through the conduit 20. The scrubbing chamber 18 also has a connection for a scrubbing water feed 22 and for the scrubbing water discharge 24. The latter opens into a tank 26. The tank 26 serves for clarification of the scrubbing water by settlement of the solid particles present therein. Connected to the tank 26 is a circulating pump 28 which pumps the scrubbing water into the scrubbing chamber 18 again by way of the scrubbing water feed 22. Provided at the lower end of the tank 26 is a sediment deposition funnel portion 30 whose lower end is in turn connected to a further pump 32. The pump 32 serves to pump away sludge and used waste water. A fresh water feed conduit 34 is also connected to the tank 26 by way of a level regulator 36. The level regulator 36 serves to maintain an always constant level of scrubbing water in the tank 26, irrespective of whether used scrubbing water and sludge is just being removed by way of the pump 32 and also irrespective of the degree of vaporisation of scrubbing water in the scrubbing chamber 18.

The heating system which is operated with solid material and on which a flue gas cleaning apparatus in accordance with the invention is shown here by way of example has a conventional circuit for the heating medium, in this case water. The water which is heated in the boiler 10 is fed to the heat consumers 40 by way of a circulating pump 38. The return conduit 42 from the consumers 40 is however not directly connected to the return connection 44 of the boiler 10. On the contrary the return conduit 42 communicates the consumers 40 with a heat exchanger 46 disposed in the tank 26. Additional energy is taken from the scrubbing water by that additional heat exchanger 46. That arrangement provides that the return water which is fed to the boiler 10 is already heated somewhat again. That can provide for additional recovery of energy in an advantageous fashion.

Figure 2:
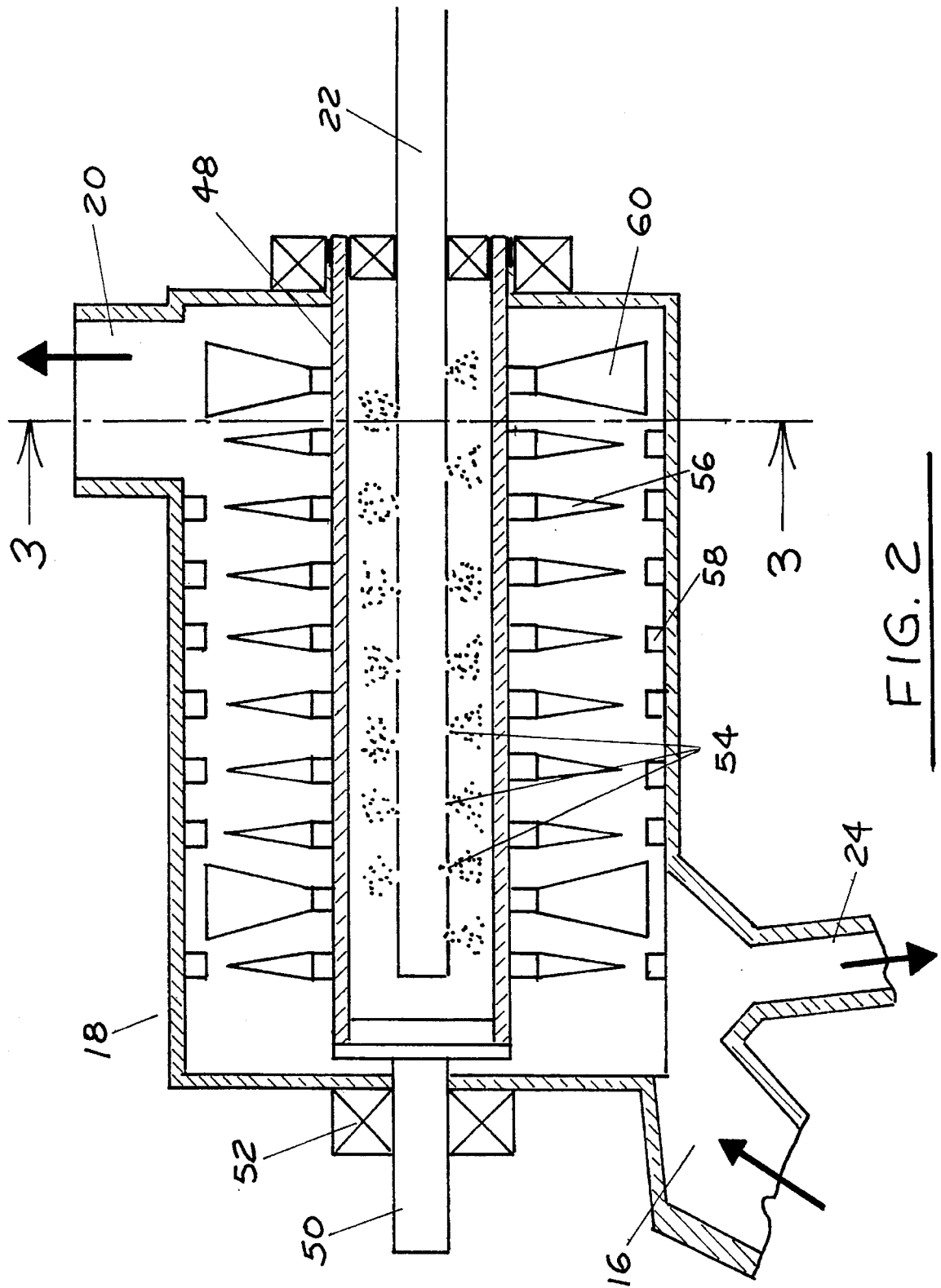
Figure 3:
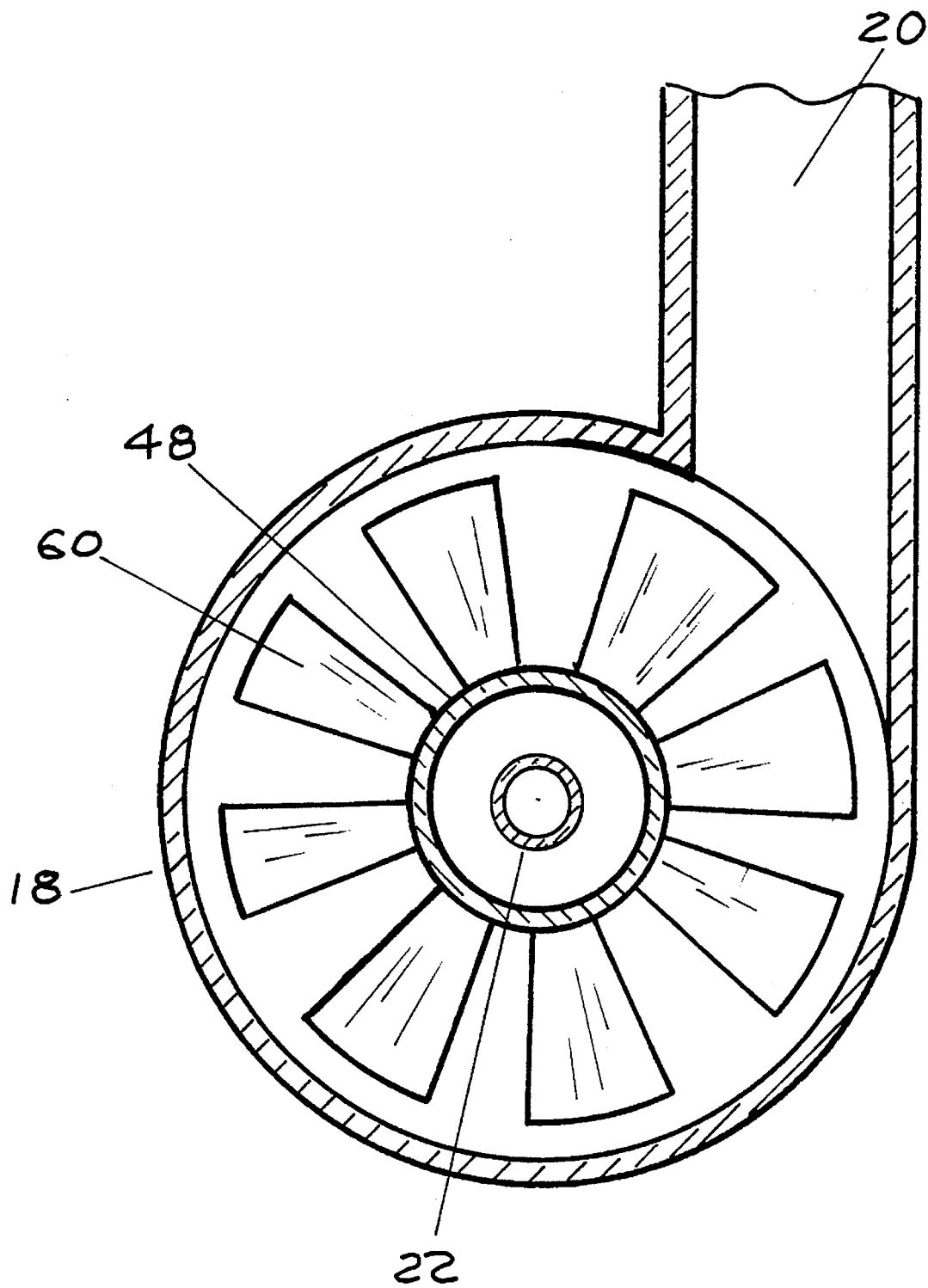

The scrubbing chamber 18 itself will now be described in greater detail with reference to FIGS. 2 and 3. The scrubbing chamber 18 comprises a substantially cylindrical body which is preferably arranged in a lying position. Provided at the bottom at one end is the feed 16 for the uncleaned flue gas and a discharge or drain 24 for the used scrubbing water. Disposed at the top at the opposite end is the flue gas discharge 20 for the cleaned flue gas. A hollow shaft 48 is sealingly and rotatably mounted on the axis of rotation of the cylindrical scrubbing chamber 18. The shaft is closed in the cylindrical scrubbing chamber 18 at the end thereof at which the flue gas feed 16 is disposed. The closure means carries a further thin shaft 50 which is extended out of the cylindrical scrubbing chamber 18 by way of a gas-tight bearing arrangement 52. A controllable drive can be coupled to the shaft 50. With that arrangement the circulating pump 28 for the scrubbing water can also be coupled to the same shaft in order to spare an additional drive device. An electric motor is preferably used as the drive device. The hollow shaft is also gas-tightly supported at the opposite end of the scrubbing chamber 18. From that end a pipe 22 which is concentric with respect to the hollow shaft leads into the hollow shaft 48.

In that arrangement the pipe 22 is stationary and a gas-tight bearing arrangement is provided between the pipe and the hollow shaft. The pipe 22 has openings 54 through which the scrubbing water which is supplied by way of the pipe 22 can pass into the rotating hollow shaft. Mounted on the hollow shaft 48 and distributed over the periphery thereof are nozzles 56 which communicate with the interior of the hollow shaft 48. When the hollow shaft rotates the scrubbing water in the hollow shaft is sprayed through those nozzles 56. Disposed opposite the nozzles on the inside periphery of the cylindrical scrubbing chamber 18 are baffle or deflector plates 58 which serve for further atomisation of the scrubbing water. The hollow shaft further carries fan blades 60. They are preferably adapted to be adjustable and are disposed in the vicinity of the respective ends of the hollow shaft. The fan blades 60 serve to transport the flue gas. On the one hand the fan blades 60 can produce a certain suction draft effect which compensates for the increase in the draft resistance of the chimney, caused by the flue gas cleaning apparatus, while on the other hand the flue gas is moved in the scrubbing chamber 18 in a substantially helical path by the fan blades 60. In addition guide plates can be provided in the scrubbing chamber 18 in order to ensure that water acts on the flue gas for the maximum period of time.

FIG. 4 shows a further embodiment of a flue gas cleaning apparatus according to the invention. In this case also the apparatus has a scrubbing chamber 118 in the form of a cylinder disposed in a lying position. At one end the scrubbing chamber has a flue gas feed 116. A discharge 124 for the used scrubbing water is provided at the bottom while a flue gas discharge 120 is provided upwardly, opposite to the flue gas feed 116. At the end of the cylindrical scrubbing chamber 118, which is in opposite relationship to the flue gas feed 116, a drive shaft 150 is passed through the end face of the cylinder, with a sealing supporting arrangement. The shaft 150 is again supported outside the scrubbing chamber and is driven by a motor 152. Within the scrubbing chamber the shaft carries a fan wheel or impeller 160 at the level of the flue gas discharge 120. Adjoining the impeller 160 the shaft 150 carries a plurality of discs 170. A plan view of such a disc 170 is shown in FIG. 5. The disc 170 has a central bore 171 for the shaft to pass therethrough, and also sector-shaped openings 172, between which are arranged limb portions 174 which carry a ring extending around the disc at the outside thereof. Bores 176 are provided in the regions in which the limb portions meet the outer ring. In that arrangement the limb portions can be so shaped that they also act like fan blades. They can preferably be of a turbine vane-like configuration.

The discs 170 are connected on the shaft by screwthreaded rods 180 with spacer sleeves. In that arrangement the screwthreaded rods 180 extend through the bores 176 in the individual discs. Spacer rings 190 are also disposed between the discs 170 on the shaft 150. It will be appreciated that they must be of the same dimension as the spacer sleeves on the screwthreaded rods 180. Vanes 192 are welded on to the spacer rings 190, the vanes contributing to producing further turbulence in the water (see FIG. 6).

In that respect it is particularly preferred for the level of water in the scrubbing chamber to be so regulated that as they rotate the screwthreaded rods 180 just dip into the scrubbing water and spray it around again.

In this embodiment of the invention the scrubbing water which is freshly introduced into the scrubbing chamber is not sprayed from the inside outwardly by way of a hollow shaft, but is sprayed by way of nozzles 156 which are arranged at the top at the peripheral surface of the cylindrical scrubbing chamber 118. This embodiment is therefore simpler to build from the structural point of view. It also involves even slighter sealing probems as in this case it is only necessary to provide one location that requires sealing, where a shaft passes into the scrubbing chamber.

The particular advantage of the flue gas cleaning apparatus according to the invention is that the vanes which rotate in the scrubbing chamber provide that the contaminating materials are washed out of the flue gas to a substantially better degree. More specifically, due to the so-called wiping effect produced in a rotating machine, the effective surface area of the drop is increased by a multiple. In addition, in the embodiment of the invention shown in FIG. 4, multiple use of the scrubbing water in one passage through the scrubbing chamber is achieved by virtue of the controllable level of water therein. More specifically, the fact that the screwthreaded rods 180 repeatedly dip into the scrubbing water means that it is repeatedly thrown up.

This arrangement in accordance with the invention of a scrubbing chamber in the form of a cylinder which is disposed in a lying position and in which a water-atomising device rotates can achieve the same cleaning effect as in the installation in accordance with WO 84/03843, with a substantially lower level of expenditure and a substantially smaller space requirement. It is usually sufficient for a cleaning apparatus according to the invention to be of a diameter which is about 3–4 times that of the flue gas pipe and to correspond in terms of its length approximately to 6–8 times the diameter of the flue gas pipe.

It is then also no longer necessary to provide a chimney. The air-conveying effect of the flue gas cleaning apparatus already guarantees a sufficient draft in the firing system. As the cleaned flue gas also no longer contains practically any contaminating materials, it can also be discharged into the environment at low level. In that way therefore it is also possible to save on the chimney fitments which are otherwise really expensive.

Figure 7:
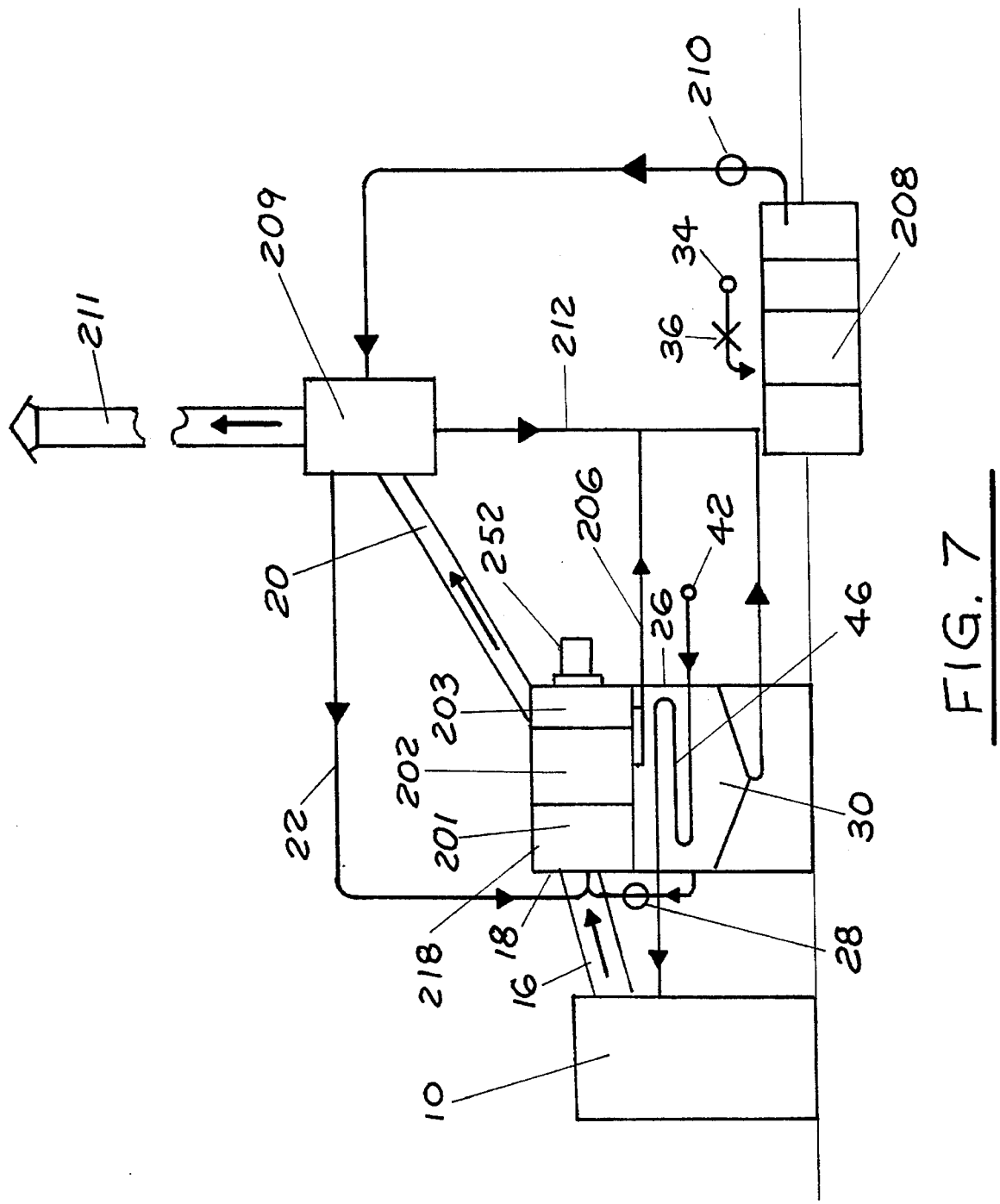
FIG. 7 is a block circuit diagram of a particularly preferred flue gas cleaning apparatus according to the invention.
Figure 8:
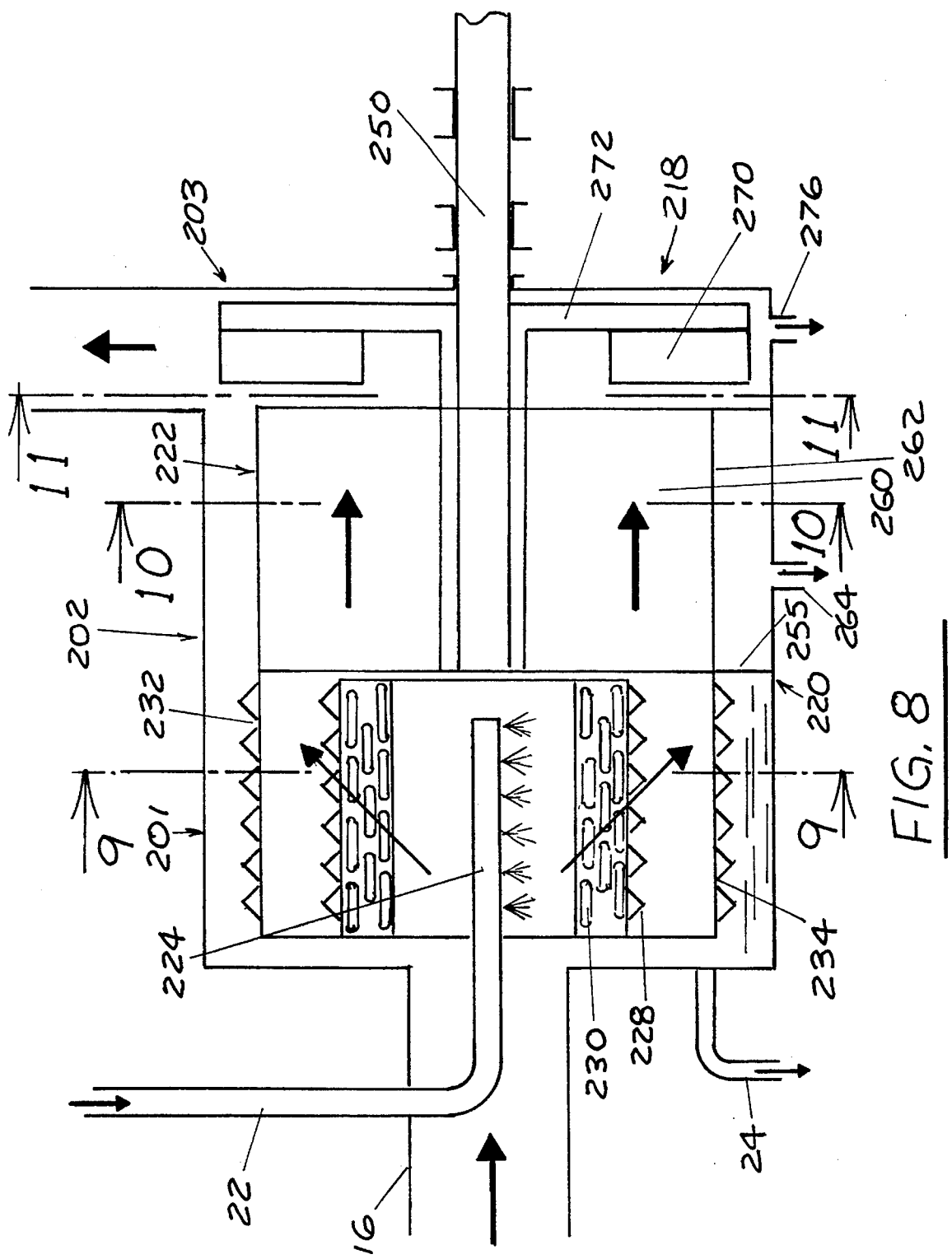
FIG. 8 is a view in vertical longitudinal section through a scrubbing chamber for a flue gas cleaning apparatus as shown in FIG. 7.
Figure 9:
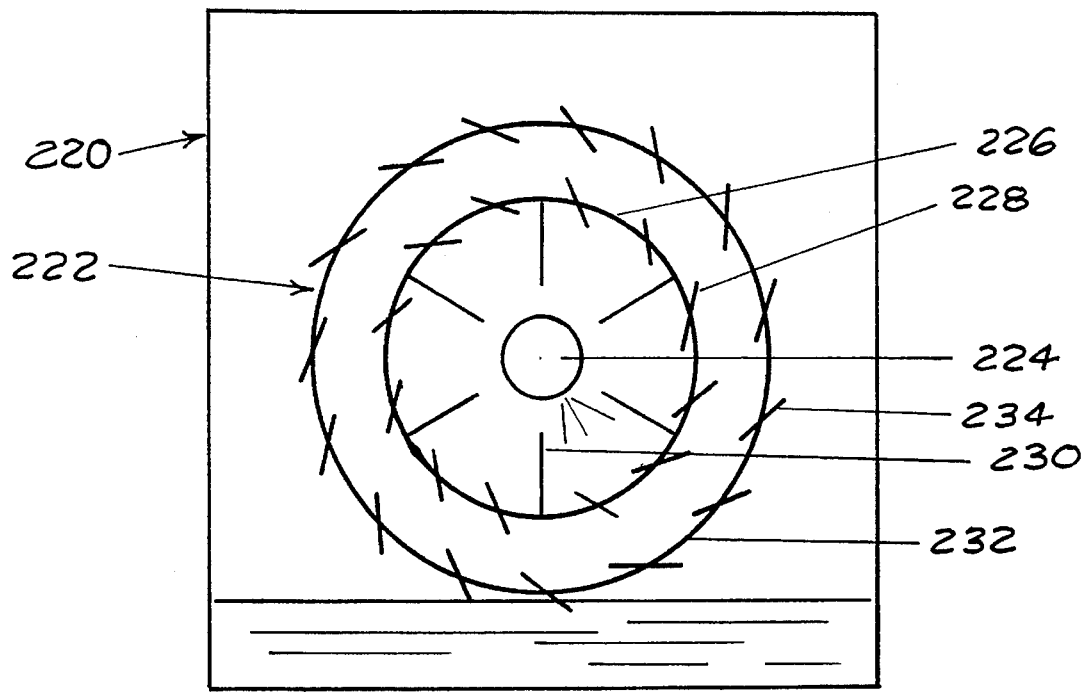
FIG. 9 is a view in section taken along line 9—9 through the scrubbing chamber shown in FIG. 8.

A further, particularly preferred flue gas cleaning apparatus is shown in FIGS. 7–11. As shown in FIG. 7, this flue gas cleaning apparatus also has a boiler 10 which is communicated with a scrubbing chamber 18 by way of a flue gas discharge conduit 16. The flue gas conduit 20 is also connected to the scrubbing chamber 18. In contrast to the above-described flue gas cleaning apparatus however the scrubbing chamber 18 here is divided into three zones 201, 202, 203. The structure of the scrubbing chamber 18 will be described in greater detail hereinafter with reference to FIGS. 8–11.

In this embodiment of the flue gas cleaning apparatus only the waste waters of the scrubbing zone 201 are passed to the tank 26. Here too connected to the tank 26 is a circulating pump 28 which returns the scrubbing water to the scrubbing chamber 18 again by way of the scrubbing water feed 22. In this case also a sludge settlement funnel portion 30 is provided at the lower end of the tank 26. In this case also sludge and used waste water are removed from the lower end of the sludge settlement funnel portion 30. The waste water is passed to a clarifying tank 208. Here also the tank 26 contains a heat exchanger 46 which preheats the cooled heating water returning from the heat consumers by way of the return conduit 42, before it is passed to the boiler 10 again.

The waste water from the centrifuging zone 202 and from the fan 203 is passed directly to the clarifying tank by way of a further conduit 206.

The arrangement described herein has the advantage that only the very hot water which comes from the scrubbing zone 201 but which is not so heavily contaminated is passed to the tank 26. As a result the water temperature in that tank is higher and it is advantageously possible to provide for a greater rise in temperature of the return water in the heating circuit, which returns from the heat consumers. That increases the level of efficiency. In addition the more heavily contaminated water is no longer circulated but is passed directly to the clarifying tank. Preferably the clarifying tank is lower than the scrubbing chamber 18 and also lower than the lower end of the sludge settlement funnel portion 30. In that way the discharge flow of the severely contaminated water into the clarifying tank 208 can take place solely due to the force of gravity and without the incorporation of a specific pump for that purpose. Here too a drive motor 252 for the rotatable arrangement in the scrubbing chamber 18 is provided at the scrubbing chamber 18.

In this embodiment of the invention the flue gases, after leaving the scrubbing chamber 18, are also passed through a further heat exchanger 209. Clarified water from the clarifying tanks 208 is fed to the heat exchanger 209 by way of a circulating pump 210. That water is preheated in the heat exchanger 209 and it is then fed by way of a further conduit to the scrubbing zone 201 in the scrubbing chamber 18. It is only then that the flue gas flows to a chimney 211 which is preferably made from high-grade steel or plastic material as condensate can also still be formed therein. It is particularly preferred for the chimney to be disposed directly above the heat exchanger 209. By virtue of that arrangement the condensate flows out of the chimney 211 into the heat exchanger 209. The heat exchanger 209 is connected to the clarifying tanks 208 by way of a further condensate conduit 212 so that the condensate from that heat exchanger 209 and possibly the condensate from the chimney 211 is also passed into the clarifying tanks 208.

The level of water in the clarifying tank 208 is kept constant. That purpose is served by a fresh water feed 34 with a level regulator 36. The vaporisation loss of water is compensated by virtue of that configuration.

A particularly preferred embodiment of the scrubbing chamber is described hereinafter with reference to FIGS. 8–11. This particularly preferred scrubbing chamber 218 is divided into three zones: scrubbing zone 201, centrifuging zone 202 and fan zone 203.

The flue gas discharge conduit 16 from the boiler 10 opens centrally at the side of the scrubbing zone 201. The scrubbing water feed 22 is passed in that arrangement into the center of the flue gas discharge 16 and there extends precisely in the center of the scrubbing zone 201. The flow path of the flue gases is indicated by arrows.

The entire scrubbing chamber 218 comprises a rectangular housing 220 which is gas-tight and water-tight and in which a rotor 222 is rotatably mounted. In that arrangement the axis of rotation of the rotor 222 is disposed horizontally and centrally in the housing 220 of the scrubbing chamber 218. It is driven by way of a way shaft 250 which, sealed off relative to the entry of the flue gas discharge 16 from the boiler, passes through a side wall of the housing 220. The shaft is suitably supported outside the scrubbing chamber 218 and is driven by the drive motor 252.

The structure of the scrubbing zone 201 is as follows:

The scrubbing water intake conduit 22 terminates in a stationary pipe 224 which is closed at the end and which extends in concentric relationship with the axis of rotation of the rotor 222. At its peripheral surface the pipe 224 has a multiplicity of small bores through which the scrubbing water is sprayed. Arranged around that pipe is a cylindrical portion 226 of the rotor 222. The cylindrical portion 226 of the rotor 222 comprises a peripheral surface of apertured or slitted sheet metal from which small sheet metal portions 228 additionally project outwardly in order to improve the turbulence effect in the water. In addition, to improve the centrifugal effect, sheet metal portions 230 which are apertured or preferably provided with horizontal slits are disposed extending radially inwardly at the inward side of the peripheral surface of the rotor portion 226. That structure of the inner part of the rotor means that the water which sprays out of the nozzles of the inner pipe 224 is atomised in the optimum fashion and at the same time caused to participate in the rotary movement. Disposed at some distance around the inner rotor portion 226 and in coaxial relationship therewith is an outer rotor portion 232 which also comprises apertured or slitted sheet metal and which also carries small sheet metal portions 234 which are arranged inclinedly. The outer rotor portion serves to repeatedly circulate again and atomise the scrubbing water disposed in the housing 220. In order to keep a suitable amount of scrubbing water in the lower region of the housing 220, the drain 24 for the used scrubbing water is not disposed at the lowest point of the housing 220 but is displaced slightly upwardly. A perpendicularly arranged separating plate member 255 is provided to seal off the scrubbing zone 201 from the centrifuging zone 202.

That rotor portion in the scrubbing zone 201 provides for optimum atomisation of the scrubbing water and ideal thorough mixing of flue gases and scrubbing water.

Figure 10:
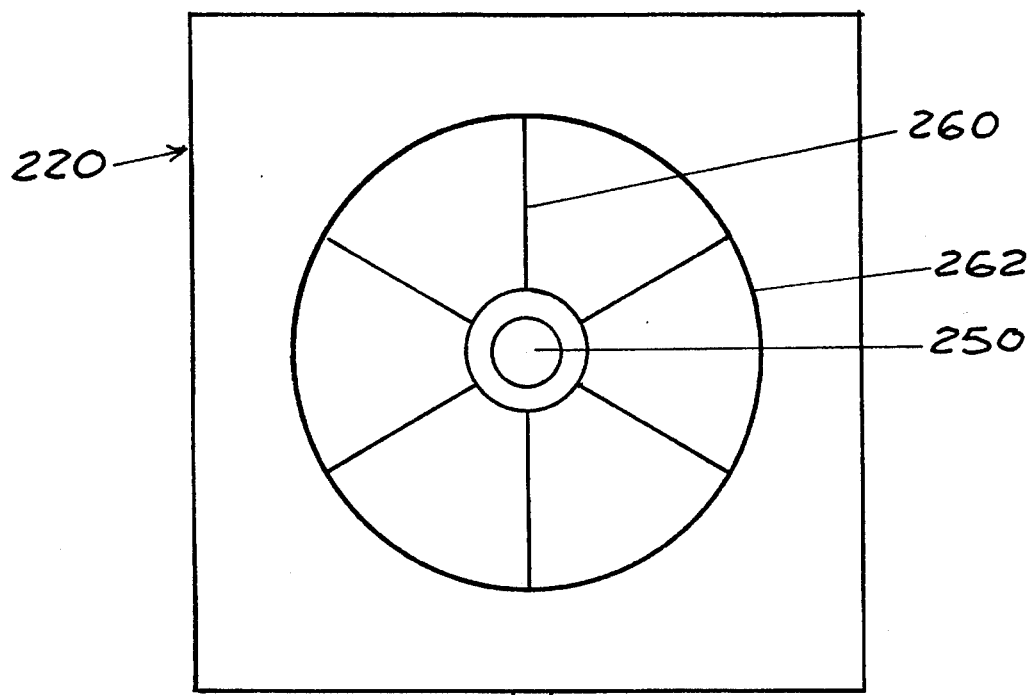
FIG. 10 is a view in section taken along line 10—10 through the scrubbing chamber shown in FIG. 8.

The centrifuging zone 202 adjoins the scrubbing zone 201. FIG. 10 shows a view in cross-section through the centrifuging zone 202. In that zone the rotor is of such a configuration that the shaft 250 which terminates at the transition from the centrifuging zone to the scrubbing zone is provided with radially extending plates 260 carrying a cylindrical coaxial drum 262 which has only very small openings. The scrubbing zone 201 and the centrifuging zone 202 are separated from each other by perpendicularly disposed plates 255. A scrubbing water drain 264 is also provided in the centrifuging zone. However the scrubbing water drain 264 opens directly into the clarifying tank 208, and it is also not provided that a residue of water remains in the centrifuging zone 202, as is the case in the scrubbing zone 201.

The centrifuging zone 202 serves to remove as much water as possible from the flue gases. It will be appreciated that that also provides for removal of the corresponding particles of dirt.

Figure 11:
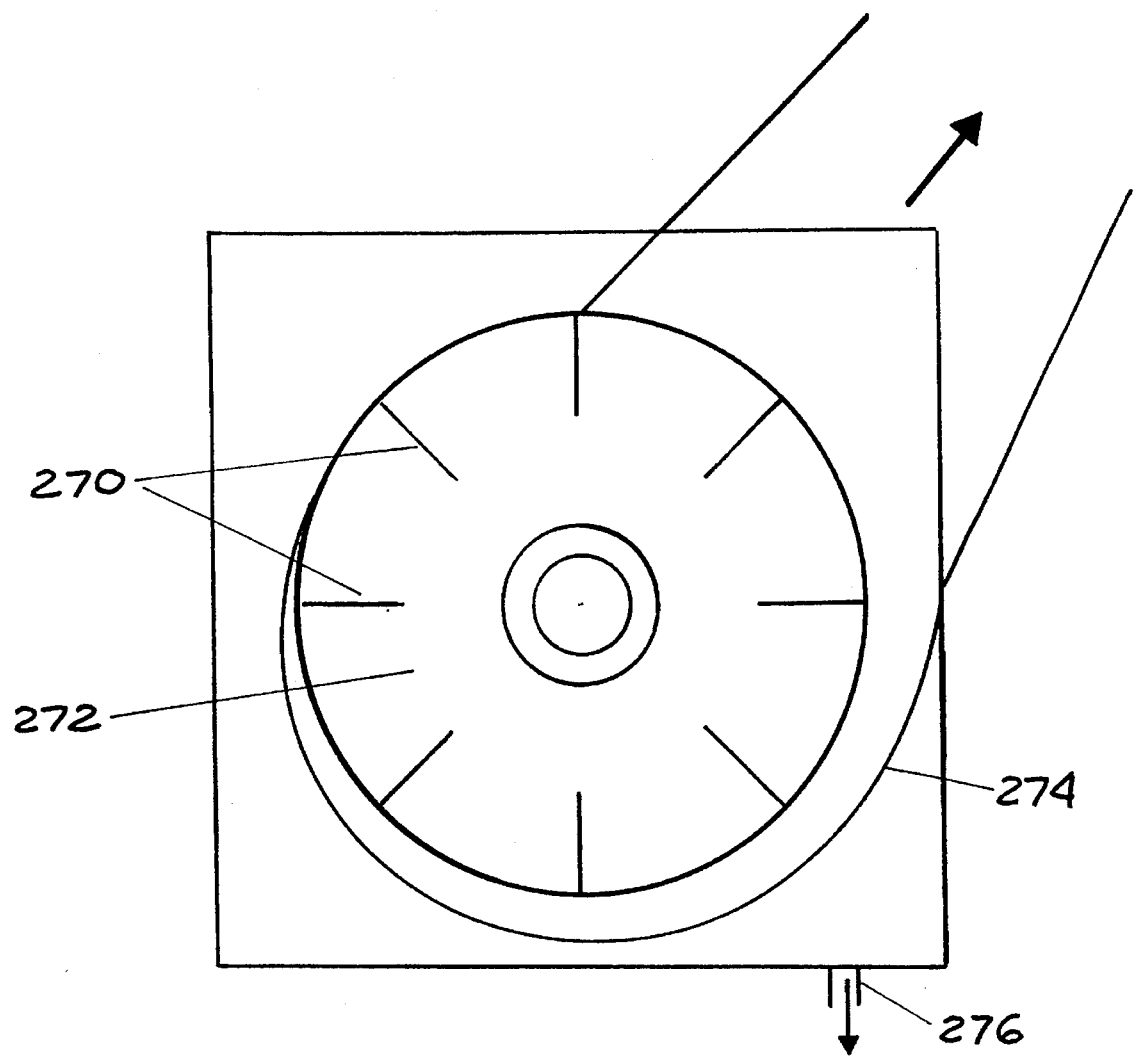
FIG. 11 is a view in section taken along line 11—11 through the fan zone of the scrubbing chamber shown in FIG. 8.

Adjoining the centrifuging zone 202 is the fan zone 203 which is shown in section in FIG. 11. In that arrangement the fan is formed by radially extending plates 270 on a disk-like carrier 272 which is also fixed to the shaft 250. In addition that fan unit is surrounded by an apertured partition 274 as an air deflector plate. This fan also has a centrifuging effect by means of which any remaining droplets of water still in the air are separated off and therefore the fan zone also has a water drain 276 at its lowest point. The cleaned flue gas which has been freed of drops of water is conveyed through the conduit 20 by the rotary movement of the fan in the fan zone 203.

The cross-section of the housing 220 is here preferably square. On the one hand, that means that more scrubbing water can be collected in the lower region of the scrubbing zone 201, while on the other hand manufacture of a rectangular housing is simpler and cheaper than manufacture of a cylindrical housing.

I claim:

1. Apparatus for flue gas cleaning comprising a scrubbing chamber, a flue gas feed means, a flue gas discharge means, a drain means for used scrubbing water and a device for feeding the scrubbing water, wherein arranged in the scrubbing chamber is a device which is rotatable about a horizontal axis by means of a drive motor and which carries means for atomization of the scrubbing water and fixed to the rotatable device are means for transportation of the flue gas and the atomized scrubbing water in helical movements in a horizontal direction through the scrubbing chamber, said drain means for used scrubbing water is so arranged that a sump of scrubbing water remains in the scrubbing chamber and said means for atomization of the scrubbing water arranged at the rotatable device partially dip into said sump.

2. Apparatus according to claim 1, further comprising a circulating means for the scrubbing water, which includes a circulating pump and which connects the drain means for the used scrubbing water and the device for feeding the scrubbing water.

3. Apparatus according to claim 2, wherein the circulating means includes a tank in which the used scrubbing water is collected so that solid contaminating materials can settle, said tank being connected to the drain means for the used scrubbing water and with said circulating pump.

4. Apparatus according to claim 3, wherein the tank includes a heat exchanger for the recovery of heat energy from the used scrubbing water.

5. Apparatus according to claim 1, wherein a hollow shaft is disposed as the rotatable device in the scrubbing chamber, wherein nozzles for spraying water into said scrubbing chamber are disposed on the outside of the hollow shaft.

6. Apparatus according to claim 5, wherein for feeding the scrubbing water into the hollow shaft, there is provided a stationary pipe on which the hollow shaft is rotatably mounted and which within the hollow shaft has outlet openings for discharge of the scrubbing water into the interior of the hollow shaft.

7. Apparatus according to claim 6, wherein adjustable fan blades for conveying flue gas are mounted on the hollow shaft in addition to the nozzles.

8. Apparatus according to claim 6, wherein deflector plates are mounted on an inside wall of the scrubbing chamber opposite the nozzles.

9. Apparatus according to claim 5, wherein the hollow shaft is coupled to a controllable drive.

10. Apparatus according to claim 1, wherein the scrubbing water is sprayed through nozzles which are mounted at the peripheral surface of the scrubbing chamber onto disks which are arranged at the means for atomization of the scrubbing water.

11. Apparatus according to claim 10, wherein the means for atomization of the scrubbing water carries a fan wheel.

12. Apparatus according to claim 10, or claim 11 wherein spacer portions with blades welded thereto are mounted between the disks.

13. Apparatus according to claim 10, wherein the disks have sector-shaped openings between which extend limb portions which are in the form of turbine vanes.

14. Apparatus according to claim 1, wherein the scrubbing chamber is divided into a scrubbing zone which contains the means for atomization of the scrubbing water and the device for feeding the scrubbing water, a centrifuging zone which contains the means for transportation of the flue gas and the atomized scrubbing water in helical movements to dry the flue gas and a fan zone which contains a device for conveying cleaned and dried flue gas into the flue gas discharge means.

15. Apparatus according to claim 14, wherein the device for feeding the scrubbing water in the scrubbing zone is a stationary pipe which extends horizontally on the axis of rotation of the rotatable device and which is closed at one end and which has a multiplicity of fine nozzle openings at its peripheral surface.

16. Apparatus according to claim 15, wherein the pipe is surrounded by an inner cylindrical portion of a rotor and an outer cylindrical portion of the rotor, wherein said inner cylindrical portion and said outer cylindrical portion are arranged coaxially on the rotor and are of different diameters.

17. Apparatus according to claim 16, wherein the inner portion of the rotor is additionally provided with radially extending apertured or slitted sheet metal portions at the inside of its peripheral surface.

18. Apparatus according to claim 14, wherein separating plate members are disposed between the scrubbing zone and the centrifuging zone and the drain means for the scrubbing water is disposed in a slightly raised position at the outer side wall of the scrubbing zone.

19. Apparatus according to claim 14, wherein in the centrifuging zone, the means for atomization of the scrubbing water are provided with a cylindrical coaxial drum which has only very small openings and which is connected by means of radially extending plate portions to a shaft member of the means for atomization of the scrubbing water.

20. Apparatus according to claim 14, wherein in the fan zone the device for conveying cleaned and dried flue gas is provided with a disk which is disposed perpendicularly to the axis of rotation of the device for conveying cleaned and dried flue gas and which is provided in its outer region with radially extending plate portions which extend in the direction of the axis of rotation.

21. Apparatus according to claim 20, wherein a fan disk is provided at the device for conveying cleaned and dried flue gas and surrounded by an aperture plate portion which is in the form of an air deflector plate.

* * * * *

UNITED STATES PATENT AND TRADEMARK OFFICE
CERTIFICATE OF CORRECTION

PATENT NO. : 5,480,463

DATED : Jan. 2, 1996

INVENTOR(S) : Harald HACKL

It is certified that error appears in the above-indentified patent and that said Letters Patent is hereby corrected as shown below:

Column 1, line 28, change "omission" to -- emission -- ;

Column 1, line 32, change "omission" to -- emission --;

Column 5, line 15, change "probems" to -- problems --.

Signed and Sealed this

Eleventh Day of June, 1996

Attest:

BRUCE LEHMAN

Attesting Officer  Commissioner of Patents and Trademarks